United States Patent [19]
Miller et al.

[11] 4,060,100
[45] Nov. 29, 1977

[54] CLOSURE FOR CYLINDRICAL PIPE

[76] Inventors: Gerald V. Miller, 125 Adams Drive; David W. Zeh, 63 Oak St., both of, Addison, Ill. 60101

[21] Appl. No.: 684,536

[22] Filed: May 10, 1976

[51] Int. Cl.² .............................................. F16L 55/10
[52] U.S. Cl. ..................................... 138/89; 215/228; 220/230; 220/375
[58] Field of Search ............... 138/89, 96 R; 215/230, 215/228; 220/230, 82 R, 37 S; 285/121; 122/360–364; 89/36; 4/29 S; 248/188.9; 108/208; 135/54, 64

[56] References Cited
U.S. PATENT DOCUMENTS

| 2,798,504 | 7/1957 | Gast | 138/89 |
| 3,807,457 | 4/1974 | Logsdon | 138/89 |

*Primary Examiner*—Houston S. Bell
*Attorney, Agent, or Firm*—Fitch, Even, Tabin & Luedeka

[57] ABSTRACT

A closure for covering and providing access to the interior of a cylindrical pipe or the like is disclosed. The closure has a cap portion and a cover portion, the cap portion being secured to the end of a pipe to which access is desired and the cover is adapted to be releasably attached to cover the aperture in the cap portion. By removing the cover, special tools or the like can be inserted through the aperture of the cap portion for the intended purpose. The closure is preferably made of a nonmetallic material and has a ferromagnetic member attached to the interior of one of the cap and cover portions to enable a metal detector to find the same when the closure is applied below grade.

6 Claims, 4 Drawing Figures

U.S. Patent  Nov. 29, 1977  4,060,100
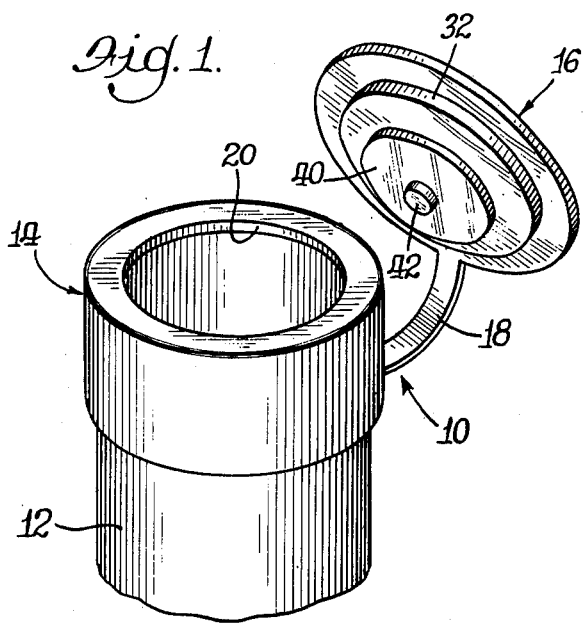
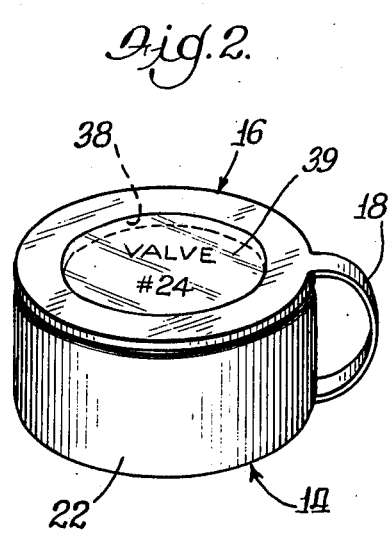
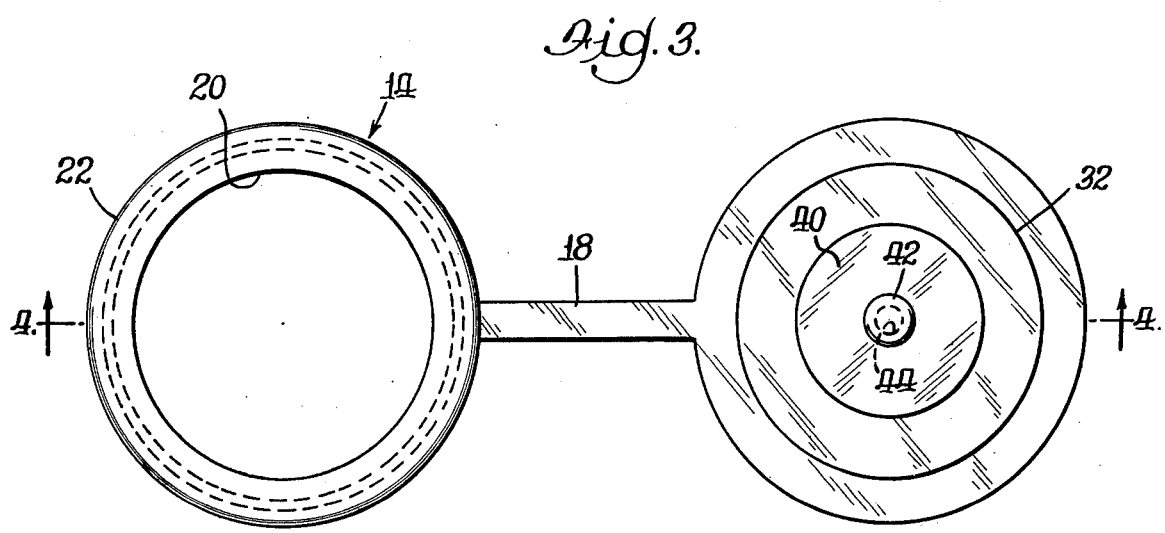
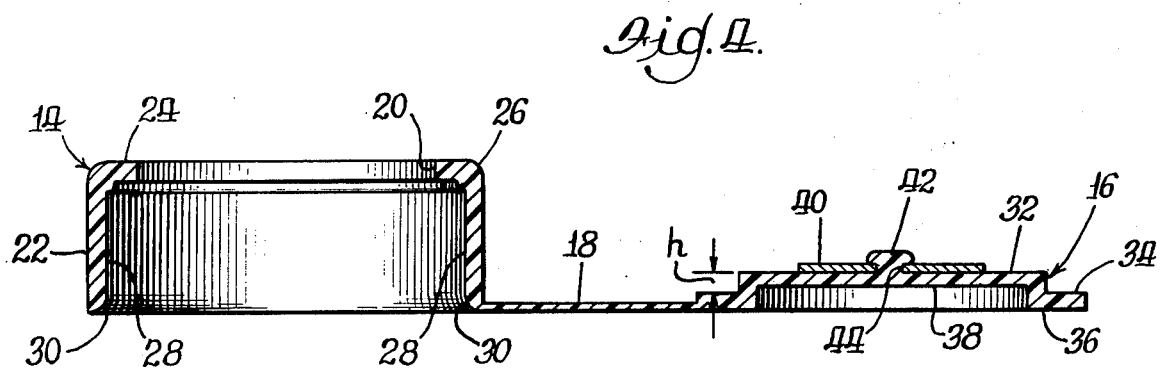

CLOSURE FOR CYLINDRICAL PIPE

The present invention generally relates to closures and, more specifically, to a closure for gaining access to the interior of a cylindrical object such as a pipe used in irrigation systems, for example.

Irrigation systems that are used to water golf courses, parks, lawns or other large expanses generally have a number of control valves located at diverse geographical areas that are distant from main buildings or pump enclosures. In those climates where the grass becomes dormant in the winter season and where the systems have to be drained of water to preclude the water from freezing and bursting the irrigation pipes, control valves have to be operated to shut down the system before winter and to start up the system in the spring. To provide access for the valves, which may be 2 or more feet below grade, it is common practice to utilize a relatively short piece of pipe or conduit that extends from the valve handle to an elevation slightly below grade so that the valve may be turned on and off without digging up the terrain in the immediate area of the valve.

Since many of the valves are only operated twice a year, i.e., in the spring when the irrigation system is placed into operation and in the fall when the system is taken out of operation, the valves are only used infrequently. During the mowing season there will be an accumulation of grass and other debris, and it is common practice to provide a cap over the access pipe to prevent debris and other material from entering the access conduit since it would have to be cleaned out for the tool to be used to turn on the valve. If the access conduit is in an area that is being mowed, it is desirable that it not protrude above the ground level and thereby interfere with mowers and the normal use of the area. For this reason, the accessed conduits are typically terminated a few inches below grade which necessarily increases the probability that debris and other matter would enter the access conduits in the absence of a cover. Covers typically in use are made from steel or other ferromagnetic metal that are expensive and often vulnerable to corrosive and rusting conditions. The use of ferromagnetic metallic closures have one advantage in that metal detectors can be used to ascertain their location in the event they are slightly below grade and are not readily visible. However, because of their tendency for rusting and corroding, they must be replaced periodically.

Accordingly, it is an object of the present invention to provide an improved closure for providing access to cylindrical pipes or the like, which is more economical and yet offers all the advantages of metallic prior art closures.

Other objects and advantages will become apparent upon reading the following detailed description, while referring to the attached drawings, in which:

FIG. 1 is a perspective view of the closure embodying the present invention in conjunction with the segment of a cylindrical pipe to which it is attached;

FIG. 2 is a perspective view of the closure substantially similar to that shown in FIG. 1 but in a closed position;

FIG. 3 is a top plan view of the closure embodying the present invention; and,

FIG. 4 is a cross-sectional view taken generally along the line 4—4 of FIG. 3.

Turning now to the drawings and particularly FIG. 1, there is shown a closure 10 embodying the present invention that is applied to a segment of conduit 12 which may be a PVC or other plastic or plastic-like conduit segment that is used in an irrigation system or the like. The conduit 12 extends from a point just below grade down to a valve (not shown) that may be located 2 or more feet below grade. Since the pipe 12 is only used to provide a passageway for an elongated tool that is used to open or close the valve, and serves no other purpose (such as operating as a conduit for a water), it does not have to be watertight or capable of withstanding any water pressure. The sole purpose is to provide access through the ground to the elevation of the valve stem.

The closure 10 is shown to have a cap portion 14 as well as a cover portion 16 which are preferably integrally molded and attached to one another by a flexible elongated bridge portion 18. The closure is preferably molded from a resilient, deflectable material, such as, for example, nylon, polyolefin, copolymers as well as homopolymers of acetyl formaldehyde, rubber modified polystyrene, ABS, polyvinyl chloride or other suitable material that can be molded or formed and has at least limited resiliency. The above mentioned materials resist corrosion and do not rust or otherwise appreciably degrade due to the normal environment conditions that are typically experienced on golf courses and other areas which may have such irrigation systems.

As can be readily observed from the drawing of FIG. 1, the cap portion 14 has an aperture 20 therein through which access to the interior of the conduit 12 can be gained. In this regard, it is preferred that the size of the aperture be substantially similar to the inside diameter of the conduit 12 so that the opening will not be unnecessarily restricted. As is best shown in FIGS. 3 and 4, the cap portion 14 is generally cylindrically shaped and has a sidewall 22 which terminates in a top portion 24 in which the aperture 20 is located. The interface between the sidewall 22 and top 24 is preferably rounded as shown at 26 for safety reasons as well as to provide a slight clearance between the cap portion 14 and the cover portion 16 when the cover portion is in a closed position as shown in FIG. 2. This facilitates easily opening the cover portion when desired. The inside surface 28 of the sidewall 22 is preferably tapered inwardly toward the top 24 by a small incremental angular amount, 1° for example, so that when the cap portion 14 is applied to the conduit 12, the cap portion will be force-fit or frictionally engaged with the outside surface of the conduit 12 so that it will not be easily removed. In this regard, a solvent or adhesive may be used to bond the cap portion 14 to the conduit, a solvent being effective in the event the materials that are used for the cap portion and conduit are chemically compatible for such bonding. The lower portion 30 of the inside surface 28 of the cap may be outwardly curved as shown to facilitate initial application of the closure to the conduit.

Turning now to the cover portion 16 in detail, it is shown to be of generally flat circular shape having an outer diameter that is substantially similar to the outside diameter of the cap portion so as to be substantially coextensive with the top portion of the cap when it is applied in closed position as shown in FIG. 2. The cover portion has a cylindrical extension 32 that protrudes from the basic plane of the surface 34 of the cover portion by a height "h" (see FIG. 4) that is generally comparable to the thickness of the top portion 24 of the cap portion. The extension 32 has an outer diameter that is substantially similar to the inside diameter of the aperture 20 and preferably slightly larger than the same so that when the cover portion is placed in its closed position, the extension 32 will snugly fit within the aperture 20 to retain the same in a releasable but lock condition as shown in FIG. 2.

Referring to FIGS. 2 and 4, the opposite side 36 of the cover portion is shown to have a recess 38 that is circularly shaped and slightly smaller in size compared to the extension 32. The recess 38 forms a convenient receptacle for an identifying disk 39 carrying indicia or the like (VALVE No. 24 in FIG. 2) which can identify the particular valve that is located under the ground if desired. When the closure 10 is fabricated from the materials previously described, it should be understood that a metal detector or the like would be incapable of detecting the closure, particularly if the conduit 12 is fabricated of a nonferromagnetic material. Since metal detectors are conveniently used to locate the valves, a ferromagnetic disk 40 is preferably provided and is attached to the cover portion by means of a small protrusion 42 passing through an aperture 44 in the disk 40 which is thereafter swaged or otherwise deformed to retain the disk 40 in the position shown in FIGS. 1, 3, and 4. Since the disk may be subjected to corrosive or rusting environmental conditions, the placement of the disk on the side as shown insures that when the cover is placed in its closed position, the disk 40 will be enclosed and not exposed to the environmental conditions, as would be the case if it was located on the opposite side of the cover portion. In this regard, the disk 40 may be fabricated from steel, iron or other ferromagnetic material and be zinc coated to resist rusting if desired. It should also be appreciated that while the disk 40 is in the shape as shown, it may be a ring portion or other shaped member that may be applied to the cap portion as well, rather than the cover portion as shown. In this regard, it should be located interiorly of the cap portion and not interfere with access through the aperture 20.

The bridge portion 18 provides a unitary construction and interconnects the cap portion and cover portion so that when the cover is in its open position as shown in FIG. 1, it will not be lost. After the valve has been operated it is only necessary to manipulate the cover to overlie the cap portion and thereafter press upon it to cause the extension 32 to fit within the aperture 20 of the cap. In this regard, the bridge portion 18 should be sufficiently long to enable the cover portion to easily be applied to the cap portion as shown in FIG. 2 and also be of a thickness and width that is compatible with the flexibility of the material from which it is made so that it will not be broken upon opening and closing the cover.

From the foregoing description, it should be appreciated that an improved closure has been shown and described which is less expensive to produce, compared to its metallic counterpart and which has an extended useful life in the sense that it will not rust or corrode as is the case with many ferromagnetic materials. Moreover, the incorporation of the ferromagnetic element enables a metal detector to locate the closure and because of the unique positioning thereof, the metallic member is not directly exposed to the rust producing and corrosive environment. By utilizing the plastic and plastic-like materials previously described, the closure can be provided with a color that is intended to either blend in with the existing surroundings, i.e. green in a grassy area, or be provided with a contrasting color to alert people of its location if it is visually observable.

It should be understood that although preferred embodiments of the present invention have been illustrated and described, varius modification, alternatives and equivalents thereof will become apparent to those skilled in the art and, accordingly, the scope of the present invention should be defined only by the appended claims and equivalents thereof.

Various features of the invention are set forth in the following claims.

We claim:

1. A closure for covering and providing access to the interior of a cylindrical pipe or the like comprising:
 a nonmetallic resilient cap portion having a generally cylindrical shaped side wall, the inside surface of which is adapted to fittingly engage the outside of said pipe, the top of said cap portion having an inwardly directed flange integrally formed with said wall, said flange being in overlying relation to the end of said pipe and having a circular aperture defined by the inside of said flange, said flange forming a seat into which a cover portion of said closure can be snugly engaged;
 a nonmetallic resilient cover portion adapted to overlie said cap portion for covering said aperture, said cover portion being generally circular and having an outside diameter generally coextensive with said side wall, said cover portion having a transverse cylindrical extension the outer diameter of which is substantially similar to the inside diameter of said aperture, said extension snugly engaging said aperture when said cover portion is applied to said cap portion to cover said aperture; and,
 a ferromagnetic member attached to the underside of said cylindrical extension of said cover portion.

2. A closure as defined in claim 1 wherein said member is generally circularly shaped and has an aperture therein through which a portion of said cover portion extends to hold the member thereto.

3. A closure as defined in claim 1 wherein the opposite side of said extension defines a generally circularly shaped recess for receiving an indicating marker carrying indicia or the like.

4. A closure as defined in claim 1 wherein said aperture in said cap portion is of a diameter generally corresponding to the inside diameter of the pipe to which the closure is applied.

5. A closure as defined in claim 1 wherein the inside surface of said cap portion has a small inward taper toward the end thereof to facilitate frictional locking of the cap portion to the pipe.

6. A closure as defined in claim 1 wherein said cap and cover portions are fabricated of a plastic or plastic-like material and further including an elongated flexible bridge portion integrally interconnecting said cap and cover portions.

* * * * *